E. G. STAUDE & V. A. BOKER.
TRAVEL CONTROLLING MECHANISM FOR TRACTORS.
APPLICATION FILED NOV. 4, 1916.
1,294,317.
Patented Feb. 11, 1919.
4 SHEETS—SHEET 4.
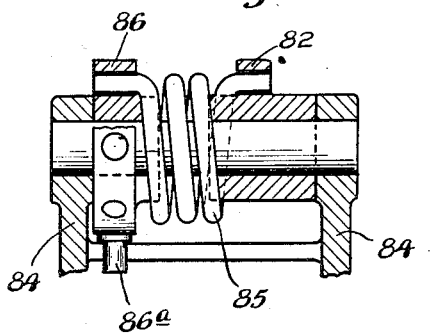
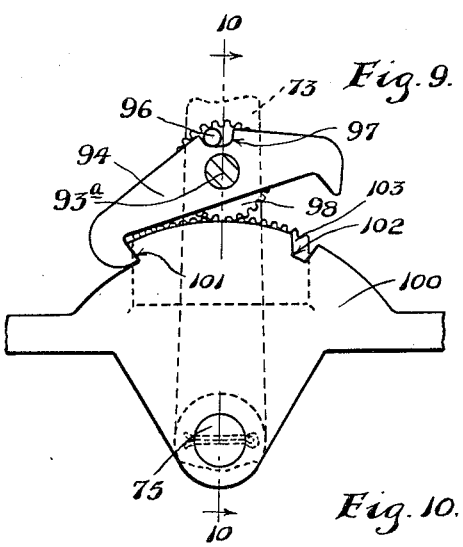
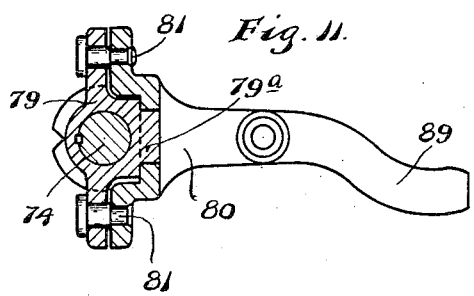
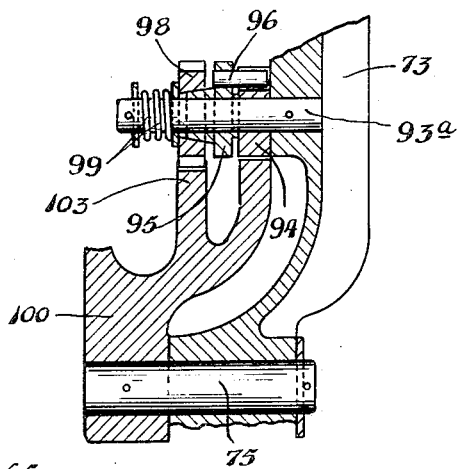
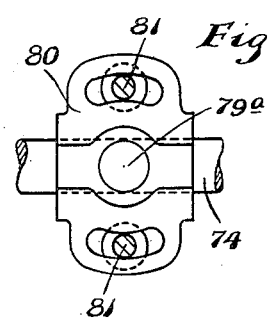
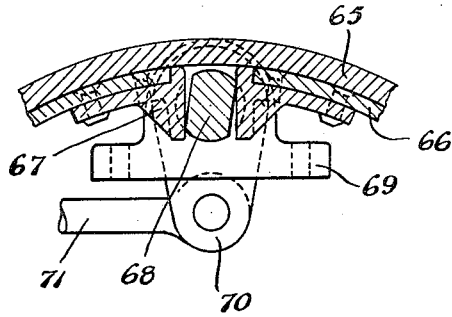
Witnesses.
H. L. Opsahl.
G. F. Williamson.
Inventors.
V. A. Boker.
E. G. Staude.
By their Attorneys.
Williamson & McLean.

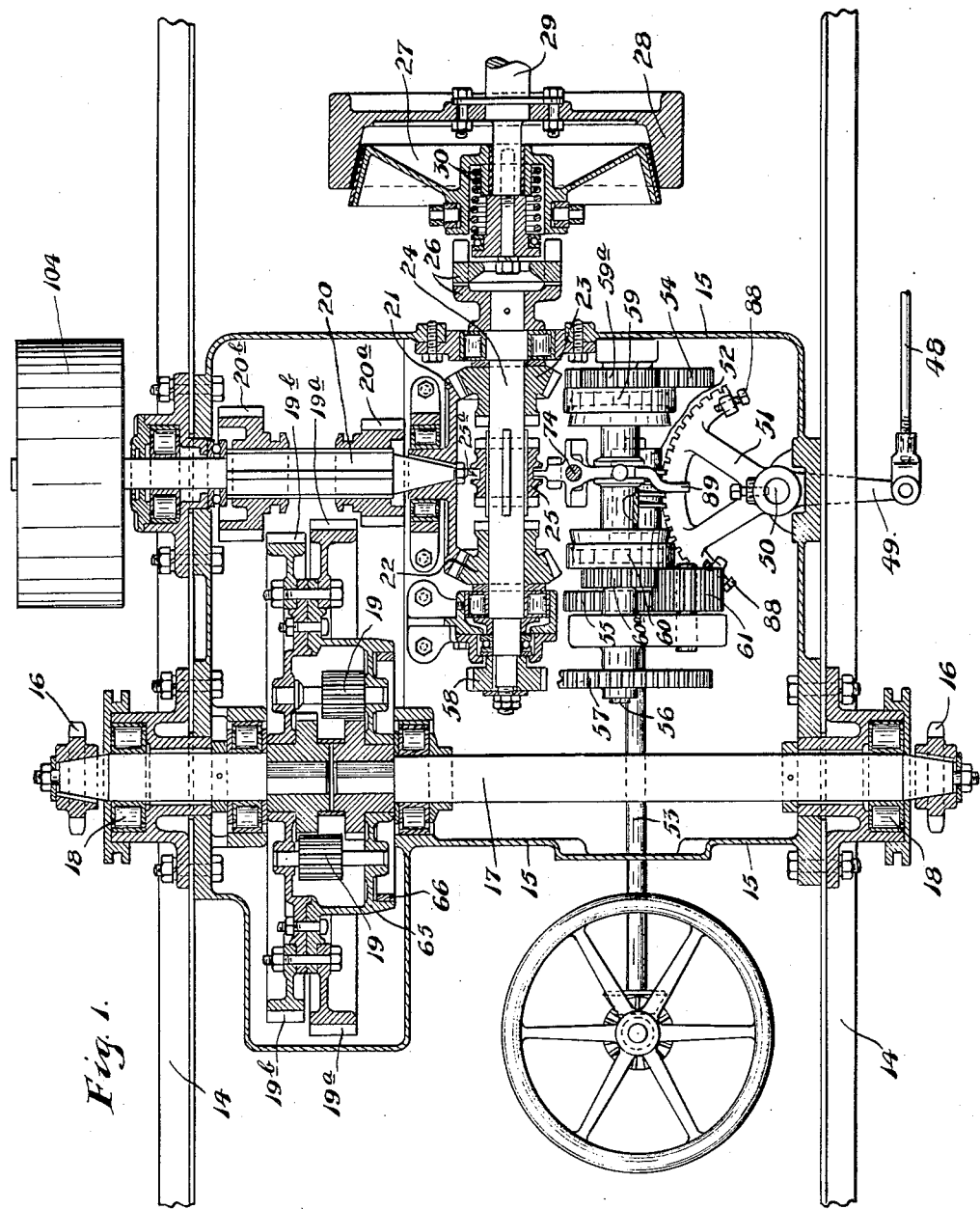

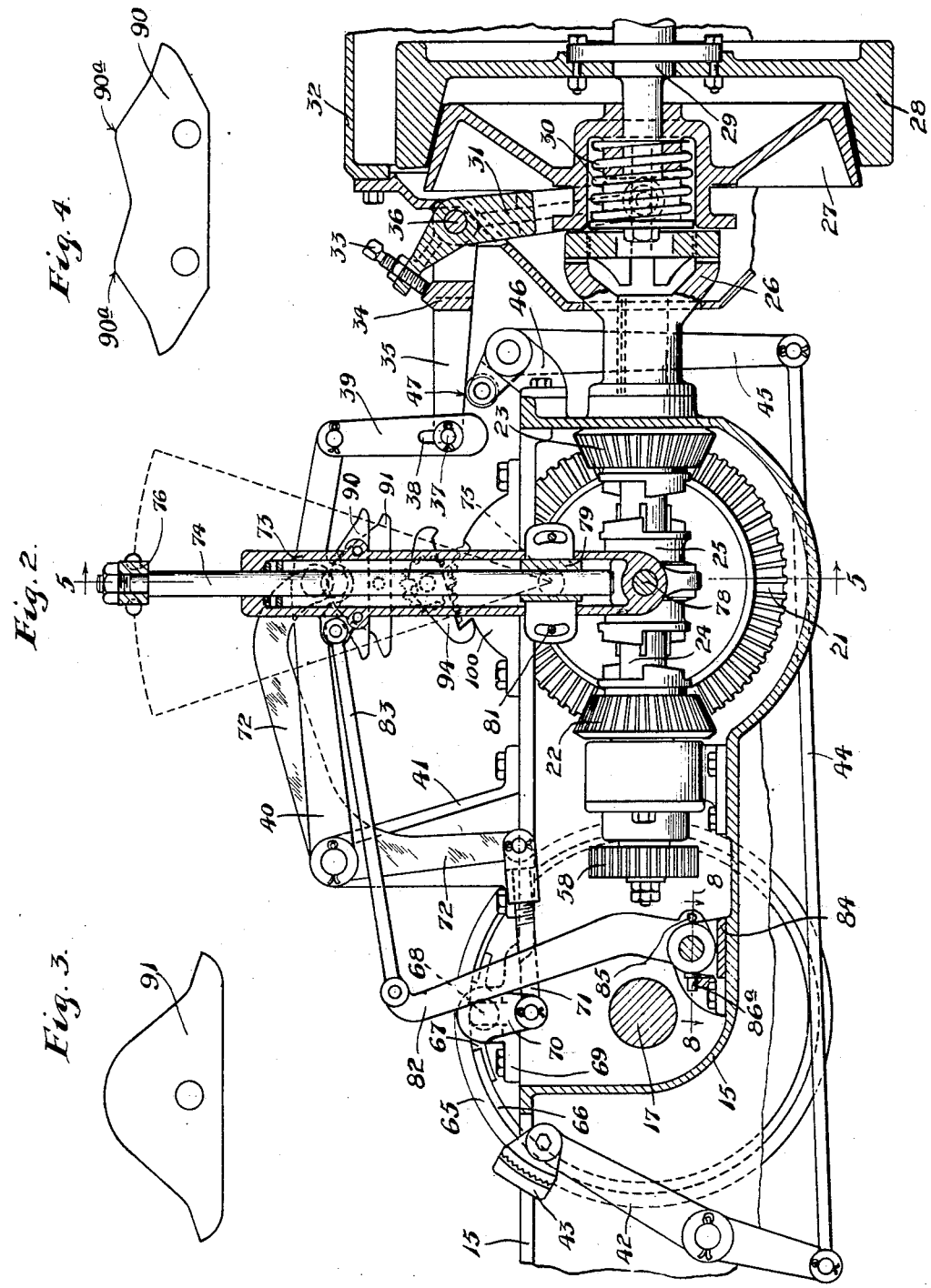

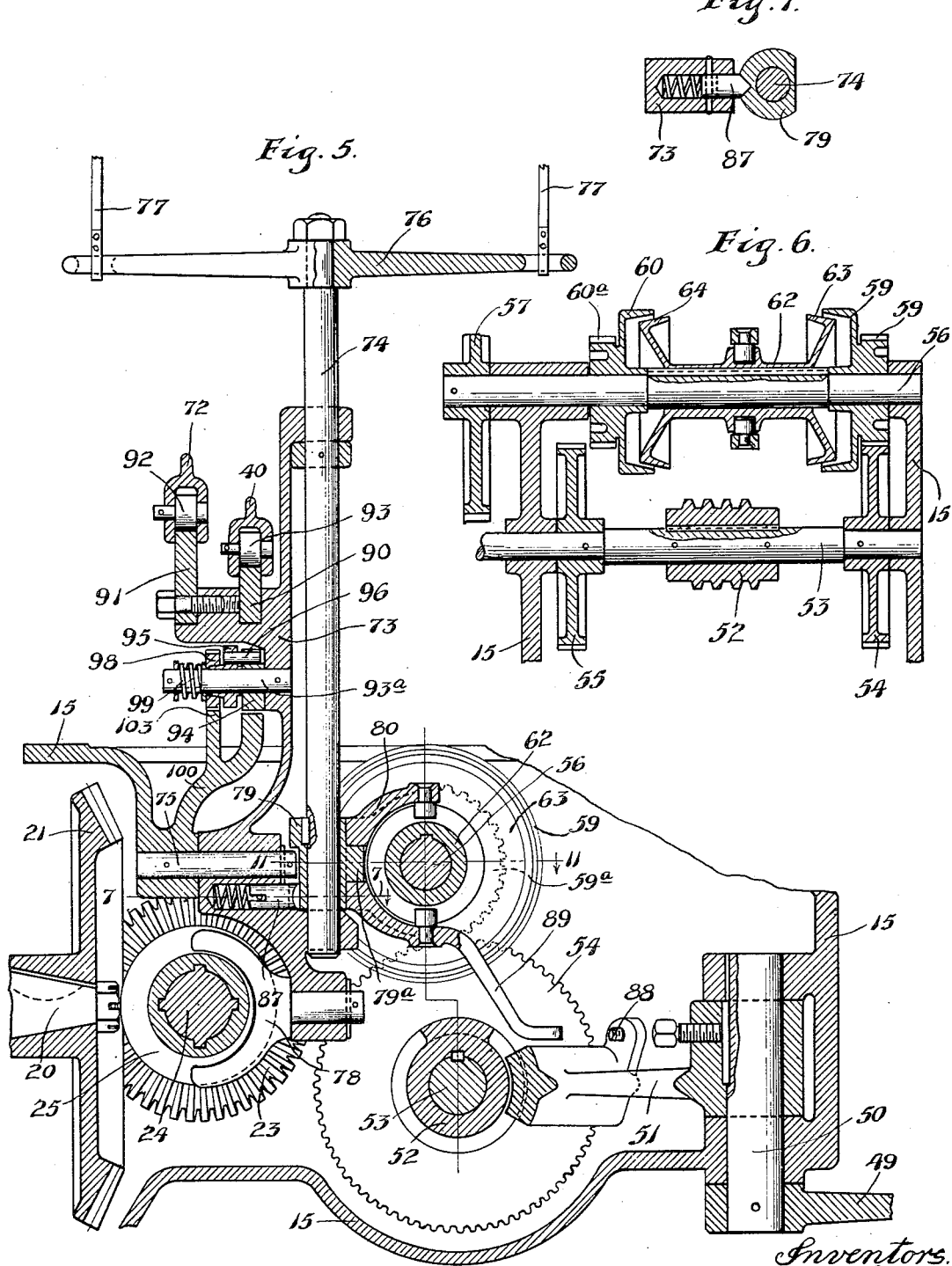

UNITED STATES PATENT OFFICE.

EDWIN G. STAUDE AND VITUS A. BOKER, OF MINNEAPOLIS, MINNESOTA.

TRAVEL-CONTROLLING MECHANISM FOR TRACTORS.

1,294,317.

Specification of Letters Patent.   Patented Feb. 11, 1919.

Application filed November 4, 1916. Serial No. 129,491.

*To all whom it may concern:*

Be it known that we, EDWIN G. STAUDE and VITUS A. BOKER, citizens of the United States, residing at Minneapolis, in the county of Hennepin and State of Minnesota, have invented certain new and useful Improvements in Travel-Controlling Mechanism for Tractors; and we do hereby declare the following to be a full, clear, and exact description of the invention, such as will enable others skilled in the art to which it appertains to make and use the same.

Our invention relates to tractors or motor-propelled vehicles, and is in the nature of a refinement of or improvement on the travel controlling mechanism disclosed and broadly claimed in the application of Vitus A. Boker, (one of the joint inventors herein), S. N. 783,292, filed August 6, 1913, and allowed August 22d, 1916, and entitled "Tractor".

In the said prior Boker application, there is disclosed a common controller for the transmission mechanism and for the steering mechanism, the said controller having movement for controlling the transmission mechanism and another movement for controlling the steering mechanism, and which common controller is yieldingly impelled forward and provided with rearwardly extended reins by means of which it may be moved bodily rearward, or oscillated, at will. In the neutral position of the controller, the transmission mechanism is thrown out of action; in the forward position of the controller, the transmission mechanism will drive the tractor forward; and in the rear position of the controller, the transmission mechanism will drive the tractor backward. By oscillating movements of one of the elements of the controller, the power driven steering mechanism will be operated to steer the tractor in either direction, and this, regardless of whether the tractor may be driven forward or rearward. The two classes of movements, the one for controlling the transmission mechanism and the other for controlling the steering mechanism are performed independently, and one without affecting the other. All of the above noted features are present in the mechanism of this application, but the present invention not only provides certain improvements on the features above enumerated, but it provides additional and highly important features. For example, there are connections operated by the common controller, arranged to set a brake when the controller is in neutral position, and also other connections serving to release a driving clutch between the engine and the transmission mechanism, and these connections are further so arranged that the brake will be automatically released and the clutch automatically set whenever the controller is moved either forward or rearward from its neutral position. Also, the invention provides various other associated devices and combinations of parts, as will more fully appear from the following detailed description.

In the accompanying drawings which illustrate the invention, like characters indicate like parts throughout the several views.

Referring to the drawings:

Figure 1 is a view partly in plan and partly in horizontal section, showing the improved transmission mechanism;

Fig. 2 shows the transmission mechanism partly in right side elevation and partly in vertical section;

Fig. 3 is a detail in elevation showing a brake-actuating cam;

Fig. 4 is a view in side elevation showing a clutch-actuating cam;

Fig. 5 is a transverse vertical section taken approximately on the line 5—5 of Fig. 2, some parts being shown in full and some parts being broken away;

Fig. 6 is a detail in vertical section showing a reversible clutch and gear mechanism for actuating the steering device;

Fig. 7 is a detail in horizontal section taken approximately on the line 7—7 of Fig. 5;

Fig. 8 is a horizontal section taken on the line 8—8 of Fig. 2, some parts being shown in full;

Fig. 9 is a view in right side elevation showing a latch for securing the controlling lever in neutral position;

Fig. 10 is a section on the line 10—10 of Fig. 9;

Fig. 11 is a detail of the controller lever in section approximately on the line 11—11 of Fig. 5;

Fig. 12 is a side elevation of one of the parts of the controller lever and which part is shown at the right in Fig. 11; and Fig. 13 is a vertical section showing parts of the brake mechanism.

The tractor may be of any suitable type, but may be assumed to be of the general type shown in Letters Patent of the United States No. 1,111,355, granted to V. A. Boker, of date, September 22d, 1914, and entitled "Transmission mechanism".

Of the parts of the tractor truck proper, only the frame 14 is shown in the drawings. The gears and various other parts of the transmission mechanism are located within a gear casing 15 that is rigidly secured to the side bars of the main frame 14 and assist in tying the latter together.

The rear traction wheels, not shown, are, in the arrangement illustrated, arranged to be driven through sprocket chains, not shown, but which chains will run over sprockets 16 on the outer ends of a transverse divided differential shaft 17 journaled in suitable bearings (as shown, roller bearings) 18, mounted on the sides of the gear casing 15, and at the inner ends of the shaft sections. The sections of the differential shaft 17 are connected through a suitable differential gear mechanism, which, as shown, is of the spur gear type and is indicated, as an entirety, by the numeral 19. This differential gear mechanism, as preferably constructed, however, has two master gears 19$^a$ and 19$^b$, the former of which is larger than the latter. The said master gears 19$^a$ and 19$^b$ are arranged to be engaged, respectively, and, at will, by spur pinions 20$^a$ and 20$^b$ mounted to slide on a short counter shaft 20 journaled in suitable bearings on the gear case 15.

Rigidly secured to the inner end of the counter shaft 20 is a beveled gear 21 that meshes with reversely facing bevel pinions 22 and 23, which pinions are rotatably loose but held against sliding movements on a longitudinal driving shaft 24, also journaled in suitable bearings on the gear case 15. The hubs of the pinions 22 and 23, at their facing ends have half clutches adapted to be engaged by the coöperating half clutches of the clutch sleeve 25 mounted to slide on the said driving shaft 24 but keyed, or otherwise held to rotate therewith.

At its front end, the driving shaft 24 is connected by a sliding knuckle joint 26 to the sliding internal member 27 of a cone clutch made up, as shown, of the said member 27 and a fly wheel or external member 28, which latter is secured to the engine crank shaft 29. The clutch member 27 is normally urged into contact with the clutch member 28 by a coiled spring 30. This clutch mechanism is, or may be of standard construction, and hence, *per se*, need not be further described. The clutch member 27 has a grooved hub that is engaged by the forked arms of the shipper lever 31 pivoted to a fixed clutch housing 32 and having an outwardly projected short upper end, shown as equipped with a set screw 33 that affords an adjustable contact with a bearing 34 carried by a lever 35, which, as shown, is pivoted to the clutch housing 32 by a pin 36 that also serves as the pivot for the shipper lever 31. At its free end, the lever 35 has a laterally projecting stud 37 that works in a slot 38 in the lower end of a link 39, which link, at its upper end, is pivoted to the free front end of a clutch actuating lever 40, which, in turn, is pivoted to a bracket 41 fixed on the gear housing 15, all as best shown in Fig. 2. As will hereafter appear, the lever 40, under manipulation of the common controller or controlling lever, automatically controls the clutch 27—28. Preferably, however, there is provided a manually operated connection whereby the said clutch may be independently operated, at will. This manually clutch operating device is best shown in Fig. 2, by reference to which it will be noted that a foot lever 42 equipped with a foot pedal 43 and intermediately pivoted to the gear housing 15, is connected at its lower end by a link 44 to the lower end of a lever 45 pivoted to a bearing 46 on the gear housing 15 and equipped at its upper end with a roller or other projection 47 that directly engages the under edge of the lever 35.

The steering wheels of the tractor are not shown, but assuming that they are of the arrangement disclosed in the Boker patent above identified, then the steering movements of the steering wheels will be imparted by endwise forward and rearward movements of the said link 48. This link 48, at its rear end, is connected to an arm 49 secured to the lower end of a short vertical shaft 50 journaled in a suitable bearing on the gear casing 15. A segmental worm gear 51 is also secured to the said shaft 50 so that it oscillates with the said arms 49. This worm gear 51 meshes with a worm 52 (see Figs. 1 and 6), the shaft 53 of which is journaled in suitable bearings on the gear housing 15 and carries two spur gears 54 and 55. Located directly above the worm shaft 53 and journaled in the same bearings is a counter shaft 56, which, at its rear end, carries a spur gear 57 that meshes with a spur pinion 58 on the rear end of the driving shaft 24, so that said shaft 56 will be driven whenever the said driving shaft 24 is connected to the engine crank shaft. Loosely journaled on the shaft 56 is a pair of reversely facing external cone clutch members 59 and 60, which, on their hubs, are, respectively, equipped with spur pinions 59$^a$ and 60$^a$. The pinion 59$^a$ is in mesh with the spur gear 54 while the spur pinion 60$^a$ and spur gear 55 are both in mesh with the wide faced intermittent idle spur pinion 61 (see Figs. 1 and 6), which pinion is journaled to a suitable bearing on the gear housing 15.

Keyed to slide on the shaft 56 is a sleeve 62 provided at its ends with reversely facing internal cone clutch members 63 and 64 that are engageable, respectively, with the cone clutch members 59 and 60 (see particularly Fig. 6). The sleeve 62 is moved endwise, either to set the two clutch members 63 and 64 in neutral positions, or to engage the same, at will, with their respective co-operating clutch members 59 and 60, by means of a controller presently to be described.

Obviously, when the clutch member 63 is engaged with the clutch member 59, the worm 52, through gears 59$^a$ and 54, will be rotated in one direction and when the clutch member 64 is engaged with the clutch member 60, said worm 52, through the gears 60$^a$, 55 and intermediate gear 61 will be driven in the opposite direction. Of course it also follows that when the worm 52 is rotated in one direction, the steering link 48 will be moved endwise in one direction, and when said worm is rotated in the opposite direction, the said steering link will be moved endwise in its opposite direction, such reciprocating movement of the said link being transmitted through the gear segment 51 and arm 49.

It has already been stated that the steering movements of the steering wheel or wheels will be imparted by the reverse endwise or reciprocating movements of the said steering link 48.

Considering again the transmission mechanism and remembering what has already been said, it will be understood that when the clutch sleeve 25 is engaged with the clutch of the beveled pinion 22, the tractor will be driven in a forward direction and that when said sleeve is engaged with the clutch of the beveled pinion 23, the tractor will be driven in a backward direction.

The brake mechanism involves an annular brake flange 65 (see Figs. 1 and 13) secured to the body of the differential master gear 19$^a$ and 19$^b$. Working within this brake flange 65 is an expansible non-rotary brake band 66 provided at its ends with abutments 67 that engage a flattened shaft 68 journaled in a suitable bearing 69 rigid on the gear housing 15. The said flattened shaft 68 has a depending arm 70 (see Figs. 2 and 13) that is connected by a link 71 to the lower arms of a bell crank 72 that is pivoted to the fixed bearing 41 already noted. Preferably, and as shown, the bell crank 72 and clutch lever 40 have a common pivotal connection to the said bearing 41.

In the above described adaptation of our invention, the common controller referred to in the introductory part of this specification is arranged to control the movements, both of the clutch sleeve 25 and of the cone-equipped clutch operating sleeve 62 and the said common controller also operates the brake and the main driving clutch 27—28. This common controller and the brake and clutch actuating mechanism is preferably of the arrangement illustrated in the drawings and now to be described.

The common controller comprises two main elements to-wit, a lever 73 and a shaft or rod 74 that partakes of the oscillatory movements of said lever but is mounted to rotate or oscillate therein. The said lever 73 is fulcrumed on a pivot stud 75 that is rigidly secured to the gear housing 15, as best shown in Fig. 5. At its upper end, the shaft 74 has a rigidly secured cross arm or head 76 equipped at its ends with rearwardly extended reins 77. At its extreme lower end, the lever 73 has a pivotally attached shipper fork 78 that engages an annular groove in the clutch sleeve 25 of the transmission mechanism. Rigidly secured to the lower portion of the shaft 74 is a sort of a bearing head 79 that is provided with an outstanding trunnion 79$^a$ that is axially alined with the pivot stud 75 on which the lever 73 is fulcrumed (see particularly Figs. 5, 11 and 12). Pivoted on the stud 79$^a$ is a shipper fork 80 that engages an annular groove in the clutch sleeve 62 of the steering mechanism. The expanded base of this shipper fork 80 is connected to the flanges of the head 79 by stud and slot connections 81 which permit limited oscillatory movements of said head 79, in respect to the said fork 80. Otherwise stated, under forward and rearward oscillatory movements of the controller lever 73 and shaft 74, the said shipper fork 80 will remain stationary and the sleeve 62 of the steering mechanism will remain stationary, but when the said shaft 74 is oscillated, the said fork 80 will be oscillated and the said sleeve 62 and its clutch members 63 and 64 will be moved. It is now evident that the clutch sleeve 25 and hence, the transmission mechanism will be controlled only by forward and rearward oscillatory movements of the controller lever 73 and that the clutch sleeve 62 and hence, the steering mechanism, will be controlled only by forward and rearward oscillatory movements of the shaft 74 and that the clutch sleeve 62 and hence, the steering mechanism, will be controlled only by rotary movements of the shaft 74 on its own axis within its bearings on the said lever 73.

The controller lever 73 is urged or pressed forward by a spring or other yielding device and is moved rearward by pulling on the reins 77. By manipulation of these reins 77, the controller may be moved forward and rearward without rotating the shaft 74; the said shaft 74 may be rotated or oscillated in the one direction or the other, at will, without moving the lever 73 either forward or rearward; or the two above noted movements may be simultaneously produced. To cause the transmission to drive the tractor backward, without changing the position of the steering mechanism, both reins 73 are pulled rearward with equal tension, and to cause the transmission mechanism to drive the tractor forward without changing the position of the steering mechanism, equal slack is given to both reins, so that the controller will be moved bodily forward without rotating the said shaft 74.

As a means for impelling the controller forward we have shown an arm 82, the upper end of which is connected to the controller lever 73 by a link 83 and the lower end of which is pivoted to a bearing 84 rigid on the gear housing 15 (see Fig. 2); and a torsion spring 85, one end of which is anchored to a lug on the hub of the said arm 82 and the other end of which is anchored to a hub 86 that is adjustably secured by a peg 86$^a$ to the said bearing 84 (see Fig. 8). This spring 85 operating through the connections described, yieldingly presses the controller lever 73 forward or toward the right, in respect to Fig. 2.

In Figs. 5 and 7, we have shown a yielding spring catch for normally holding the shaft 74 against rotation with the clutch sleeve 62 and clutch members 63 and 64 in neutral or inoperative positions, as shown in Fig. 6. This latch is in the form of a small outwardly spring-pressed plunger 87 seated in the lower end portion of the controller lever 73 and having a V-shaped nose that engages a V-shaped notch in the hub of the bearing head 79. This latch, however, can be quite easily overcome when one of the reins 77 is pulled upon harder than the other. This latch prevents accidental operation of the steering mechanism.

When the clutch member 63 is engaged with the clutch member 59 or the clutch member 64 is engaged with the clutch member 60, the worm 52, as heretofore described, will be rotated and the segmental gear 50 will be oscillated. To prevent over-movement of the segmental gear in either direction, it is shown as provided with adjustable stops in the form of stop screws 88 (see Figs. 1, 5 and 11) that are engageable with a tripping finger 89 projected from the lower prong of the shipper fork 80. Obviously, when one of the set screws 88 engages the trip finger 89, the shipper fork 80, and hence the clutch sleeve 62 and clutch members 63 and 64 will be automatically set back to their neutral positions shown in Fig. 6.

The controller lever 73 (see Fig. 5) has a laterally offset lug to which is rigidly secured two cam plates 90 and 91 (see Figs. 3, 4 and 5). The cam plate 90 (see Fig. 4) has a depressed intermediate portion between raised crowns 90$^a$ and engages a roller 93 on the intermediate portion of the clutch operating lever 40. The cam plate 91 (see Fig. 3) has a raised intermediate portion. This cam plate 91 operates on a roller 92 on the free end of the upper arm of the brake actuating bell crank 72, and sets the brake band 66, when the controller lever 73 is in its neutral position shown in Fig. 2, at which time, it will be remembered, the clutch sleeve of the transmission mechanism is also in a neutral position. Normally, the roller 93 of the clutch actuating lever 40 will be in the depression of a cam plate 90, and the main or driving clutch member 27 will be engaged with its coöperating clutch member 28, as shown in Fig. 2 of the drawing, the object of engaging the clutch member 27 in the neutral position of the controlling lever 73 and while the clutch member 25 is also in its neutral position, is to supply power from the motor to the pinion 58 for driving the steering mechanism, so that the operator may turn the front wheels to the right or left by pulling on either the right or left rein 77 while the tractor is standing still. We consider this feature of great importance since it permits turning or cramping the wheels before the vehicle is started for going ahead or backing up and, consequently, permits of making a much shorter turn.

When the controlling lever 73 is in the neutral position the roller 92 of the brake actuating bell crank 72 will be on the crown of the cam plate 91 and the brake band 66 will be forced into contact with the brake flanges 65, as shown in Fig. 13.

When the controlling lever 73 is moved forward it produces four actions, to-wit: First, it causes the roller 92 to descend from the crown on the cam plate 91, thereby releasing the brake. Second, it causes the roller 93 to travel up the incline 90$^a$, thereby releasing the clutch 27 from engagement with the fly wheel 28. Third, at this point the clutch member 25 is about to engage with the pinion 23, and the forward movement of the controller lever 73 completes the movement of the clutch member 25 into contact with the gear 23. Fourth, the roller 93 descends from the high point 90$^a$ on the cam plate 90 and allows the clutch 27 to again engage the co-acting member 28, and thereby renders the engine operative to drive the transmission mechanism, and propels the machine forward. Furthermore, when the controller lever 73 is moved rearward to cause the machine to be driven backward, the above noted brake releasing and clutch setting actions also take place in the same order as above stated.

The spring 85, acting through the arm 82 and link 83, tends to throw the controller lever 73 forward approximately to the right hand dotted lines in Fig. 2. It is, of course, highly important that provision be made for latching or securing the said controlling lever in its intermediate or neutral position. To accomplish this result, we provide a latch mechanism, the preferred form of which is best shown in Figs. 2, 5, 9 and 10, and which described, is as follows:

The said lever 73 has a laterally projecting stud 93ª on which is intermediately pivoted a lever-like latch 94 having hook-like detents, both at front and rear end. Also, loosely pivoted on the said stud 93ª is a tripping hub 95 which has a laterally projecting pin 96 that works with considerable clearance in a notch 97 formed in the intermediate upper edge portion of the latch 94.

A small spur gear 98 is journaled on the tapered hub 95 and is held in frictional contact therewith by a spring 99 that re-acts against a pin on the stud 93ª and against a washer that is thereby pressed against said gear. The frictional engagement between the hub 95 and gear 98 is journaled on the tapered hub 95 and is held in frictional contact therewith by a spring 99 that reacts against the stud 93ª. The frictional engagement between the hub 95 and gear 98 tends to cause the two to rotate together but will permit said gear to rotate on the said hub.

Rigidly secured on the gear housing 15 is a latch segment 100 having a latch shoulder 101 and a latch notch 102 (see Figs. 9 and 10) and rigidly secured to this latch segment is a gear segment 103 with which the pinion 98 is in mesh. This gear segment is on an arc of a circle having its center at the axis of the fulcrum stud 75 on which the lever 73 is pivoted. Here it may be stated that when the rear hook of the latch 94 is engaged with the latch shoulder 101, the controller lever 73 will be in its vertical or neutral position, and furthermore, that when the front end of said latch 94 is engaged with the notch 102, the said lever will also be held in its neutral position.

If the lever 73 is in a forward position causing the tractor to move forward and is then moved rearward, the stud 96 of the hub 95, under frictional driving force of the pinion 98, will throw the hooked rear end of the latch 94 onto the upper surface of the latch segment 100 and cause it to drop into engagement with the latch shoulder 101, so that it will then secure the said lever 73 in its neutral position. To release the rear hooked end of said latch 94 from said shoulder 101, it is necessary to move the lever 73 a little distance rearward and then to allow the same to travel forward, under which movement the stud 96 will force the hooked rear end of said latch above the said shoulder 101 before it is passed forward to the radial line thereof, and thus, the lever will be free for forward movement. This can be accomplished by such slight movement of the lever 73 as will not bring the hooked front end of the said latch down to the line of the notch 102 until it is passed forward over the same. If, however, the lever 73 is moved from a rearward position in which it causes the transmission to drive the machine backward, the stud 96, acting on the latch 94, will force the hooked front end thereof down onto the upper edge of the latch segment 100, so that it will be caused to engage the notch 102, and thereby lock the said lever in its neutral position. To release the front end of the said latch from the said notch 102, the lever 73 must be moved but slightly rearward and then permitted to move forward, under which action the hooked front end of the said latch will be carried forward over the said notch 102 and leave the said lever 73 free for forward movement.

It is not essential that the latch segment 100 be provided with the latch shoulder 101 and the notch 102 since either one or the other will cause the lever 73 to be locked into the neutral position. The only reason for having the two stops is that assuming that the lever 73 is in its forward or go-ahead position and the operator, by pulling on both the reins 77, desires to place the lever 73 in the neutral position by pulling on the reins the friction of the gear 98 on the tapered hub 95 through the pin or stud 96 will cause the latch 94 to bear down on the surface of the latch segment 100 and directly as it passes the shoulder 101 it will drop off and lock in that position so that a shorter movement of the lever 73 toward the rear (in order to get to the neutral position) will be required since directly after the latch drops off and engages the shoulder 101 by releasing the pull on the reins 77, the stud 96 having the free movement at the point 97 in the latch 94 as heretofore described, will not raise the latch 94 out of engagement with the shoulder before it strikes the shoulder 97 in the latch and therefore, securely locks the lever 73 in the neutral position.

Should the operator accidentally pull the lever 73, past the neutral position and then again release the reins, the stud 96 will have come in contact with the shoulder 97 on the latch 94 and cause the latch to descend into the notch 102, thereby again securing it in its neutral position.

From the above description, it can be seen that by using both the shoulder 101 and the notch 102, the neutral position can be found much easier by the operator since it provides a wider angle of the position of the lever 73, in which the neutral point may be found. However, we do not wish to be confined to the two stops in the segment 101 since it will readily be seen that one stop could perform the same function although it would make the neutral point a little more difficult to locate.

To adapt the tractor for use as a stationary power plant, the shaft 20 is provided at its outer end with the pulley 104, and in order to operate without moving the tractor, the pinions 20ª and 20ᵇ are moved out of contact with the spur gears 19ª or 19ᵇ which disengages the transmission from the differential drive and by placing the controlling lever 73 in its forward position, the drive on the pulley will be through the bevel gears 22 and 21 for driving the pulley. Power may, of course, be applied in the opposite direction through the bevel gears 23 and 21 by holding the controlling lever in the rearward position, the same as for running backward with the tractor as hereinbefore described.

In order that the clutch 27 may disengage before the clutch 25 is withdrawn from the gears 22 or 23, we provide a wider groove 25ª than the width of the part 78, so that when the controlling lever 73 is in its forward position, the part 78 will be in contact with the groove 25ª on the side nearest to the gear 22 with which it is secured and as the controlling lever is brought to the neutral position by pulling on the reins 77, as before described, the extra play in the groove 25ª will allow a movement of the part 87 without moving the clutch member 25 until the roller 93 has run part way up the incline 90ª, thereby disengaging the clutch 27 from the motor and when this point has been reached, the part 78 will have come into contact with the opposite wall of the groove 25ª and move the clutch member 25 out of mesh or contact with the gear 22 after the power has been disconnected so that the member 25 will be free to move.

What we claim is:

1. In a travel controlling mechanism for tractors, the combination with motor-propelled transmission mechanism including a clutch, of a steering mechanism, a brake, a controller for said transmission and steering mechanism, and connections whereby said controller, when in neutral position, will disconnect the power from the tractor and set said brake, and when moved from neutral position, will release said brake and connect the power.

2. In a travel controlling mechanism for tractors, the combination with motor propelled transmission mechanism including a driving clutch, of a motor propelled steering mechanism, a brake, a common controller operative on said transmission and steering mechanisms and having two primary functions, one for controlling said steering mechanism and the other for controlling said transmission mechanism, and connections whereby said controller, when in neutral position, will disconnect the power with the traction wheels and set said brake, and when moved from neutral position, will release said brake and connect said power.

3. In a travel controlling mechanism for tractors, the combination with a motor propelled reversible transmission mechanism including a driving clutch, of a motor propelled steering mechanism, a brake, a common controller operative on said transmission and steering mechanisms and having two primary functions, the one for controlling said transmission mechanism for forward and reverse drive, and the other for controlling said steering mechanism, and connections whereby said controller, when in a neutral position, will release said transmission mechanism and set said brake, and when moved either forward or rearward from neutral position, will release said brake and connect said transmission mechanism.

4. In a travel controlling mechanism for tractors, the combination with motor-propelled transmission mechanism including a clutch, of a brake, a controller for said transmission mechanism, and connections whereby said controller, when in neutral position, will release said transmission mechanism and set said brake, and when moved from neutral position, will release said brake and set said transmission mechanism, yielding means impelling said controller forward and operating reins extended rearward from said controller.

5. In a travel controlling mechanism for tractors, the combination with a motor-propelled reversible transmission mechanism including a frictional driving clutch, of a motor-propelled steering mechanism, a frictional brake, a common controller operative on said transmission and steering mechanisms and having two primary functions the one for controlling said transmission mechanism for forward and reverse drive, and the other for controlling said steering mechanism connections whereby said controller, when in neutral position, will release said transmission mechanism and set said brake and when moved either forward or rearward from neutral position, will release said brake and connect said transmission mechanism, yielding means tending to impel said controller in one direction and operating reins extending in the opposite direction.

6. In a travel controlling mechanism for tractors, the combination with motor-propelled transmission mechanism including a clutch, of a brake, a controller for said transmission mechanism, connections whereby said controller, when in neutral position, will release said transmission mechanism and set said brake, and when moved from neutral position, will release said brake and connect said transmission mechanism, and a foot operated clutch connection operative to set and release said clutch, as will, when said controller is moved from its neutral position, but inoperative to set said clutch when the latter is released by the setting of said controller in a neutral position.

7. In a travel controlling mechanism for tractors, the combination with a motor propelled reversible transmission mechanism including a frictional driving clutch, of a motor-propelled steering mechanism, a frictional brake, a common controller operative on said transmission and steering mechanisms and having two primary functions, the one for controlling said transmission mechanism for forward and reverse drive, and the other for controlling said steering mechanism connections whereby said controller, when in neutral position, will release said transmission mechanism and set said brake and when moved either forward or rearward from neutral position, will release said brake and connect said transmission mechanism, and a foot-operated clutch connection operative to set and release said clutch, at will, when said controller is in position to allow the clutch to engage, but inoperative on said clutch when the latter is disengaged by said controller.

8. In a travel controlling mechanism for tractors, the combination with a motor-propelled transmission mechanism including a driving clutch, of a motor-propelled steering mechanism, a brake, a common controller having two functions, one for controlling said transmission mechanism, and the other for controlling said steering mechanism, two cams movable by said controller, clutch actuating connections operated by one of said cams, and brake actuating mechanisms operated by the other of said cams.

9. In a travel controlling mechanism for tractors, the combination with a motor-propelled transmission mechanism including a driving clutch, of a motor-propelled steering mechanism, a brake, a common controller having two functions, one for controlling said transmission mechanism, and the other for controlling said steering mechanism, two cams movable by said controller, clutch actuating connections operated by one of said cams, and brake actuating mechanisms operated by the other of said cams, said brake actuating cam being arranged to set said brake in the neutral position of said controller and to release the same when said controller is moved from neutral position, and said clutch actuating cam being arranged to set said clutch in the neutral position of said controller and to release said clutch when said controller is moved from neutral position, and set said clutch when controller is moved to either extreme position.

10. In a travel controlling mechanism for tractors, the combination with motor-propelled reversible transmission mechanism, including a driving clutch, of a motor-propelled steering mechanism, a brake, a common controller in the form of a pivoted lever having an oscillatory shaft, connections whereby forward and rearward movements of said lever control said transmission mechanism for forward and reverse travel, connections whereby oscillatory movements of the shaft of said controller, in respect to said lever, control the said steering mechanism, two cams carried by said lever, a brake-actuated connection including a lever that is subject to one of said cams, and a clutch actuating connection including a lever that is subject to the other of said cams, said brake actuating cam having a central crown arranged to set said brake when said controller is in a neutral position, but to release the same when said controller is moved in either direction from neutral position, and the said clutch actuating cam having a central depression effecting the setting of said clutch in the neutral position of said controller, and having crowns on the opposite sides of its central depression for effecting the release of said clutch when said controller is moved a part of the distance in either direction from its neutral position.

11. In a travel controlling mechanism for tractors, the combination with motor propelled transmission mechanism, of a controller therefor in the form of a lever having a longitudinal shaft journaled thereto, the movements of said lever controlling said transmission mechanism and the oscillatory movements of said shaft on said lever controlling said steering mechanism, and means for latching said lever in a neutral position, comprising a relatively fixed latch segment, a latch dog pivoted to said lever and engageable with said latch segment, a gear segment fixed in respect to said latch segment, and a pinion meshing with said gear segment, a tripping hub having a limited movement in respect to said latch dog, and a pinion meshing with said gear segment and having a frictional rotary connection to said tripping hub.

In testimony whereof we affix our signatures in presence of two witnesses.

EDWIN G. STAUDE.
VITUS A. BOKER.

Witnesses:
BERNICE G. WHEELER,
HARRY D. KILGORE.